(12) United States Patent
Konishi

(10) Patent No.: US 12,528,742 B2
(45) Date of Patent: Jan. 20, 2026

(54) HYDRAULIC COMPOSITION

(71) Applicant: SHIN-ETSU CHEMICAL CO., LTD., Tokyo (JP)

(72) Inventor: Hidekazu Konishi, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 371 days.

(21) Appl. No.: 18/125,368

(22) Filed: Mar. 23, 2023

(65) Prior Publication Data
US 2023/0322625 A1 Oct. 12, 2023

(30) Foreign Application Priority Data
Apr. 6, 2022 (JP) .................................. 2022-063346

(51) Int. Cl.
| | | |
|---|---|---|
| *C04B 24/38* | (2006.01) | |
| *B33Y 70/00* | (2020.01) | |
| *C04B 28/04* | (2006.01) | |
| *C04B 103/50* | (2006.01) | |
| *C04B 111/00* | (2006.01) | |

(52) U.S. Cl.
CPC ............ *C04B 24/383* (2013.01); *B33Y 70/00* (2014.12); *C04B 28/04* (2013.01); *C04B 2103/50* (2013.01); *C04B 2111/00181* (2013.01)

(58) Field of Classification Search
CPC ... C04B 24/383; C04B 28/04; C04B 2103/50; C04B 2111/00181; C04B 28/02; C04B 28/08; C04B 24/38; C04B 2103/0068; B33Y 70/00
See application file for complete search history.

(56) References Cited

U.S. PATENT DOCUMENTS

2015/0315080 A1  11/2015  Konishi et al.
2016/0009599 A1 *  1/2016  Yamakawa ............. C04B 28/02
                                                          524/46

FOREIGN PATENT DOCUMENTS

| CN | 105314921 A | * | 2/2016 | ........... C04B 24/283 |
|---|---|---|---|---|
| JP | 61-227957 A | | 10/1986 | |
| JP | H-0585799 A | * | 4/1993 | |
| JP | 05213646 A | * | 8/1993 | ........... C04B 24/383 |
| JP | 2008201613 A | * | 9/2008 | ........... C04B 24/383 |
| JP | 2015-221743 A | | 12/2015 | |
| JP | 2019-194144 A | | 11/2019 | |
| JP | 2020-105023 A | | 7/2020 | |
| JP | 2022-23318 A | | 2/2022 | |
| WO | WO-2022058544 A1 | * | 3/2022 | ............. C04B 28/04 |

OTHER PUBLICATIONS

Kinetics of Thermal Gelation of methylcellulose and hydroxypropylmethylcellulose in aqueous solutins by Nitis Sarkar Carbohydrate Polymers vol. 26 Issue 3 (1995) pp. 195-203 (Year: 1995).*
Translation JP 05213646 (Year: 1993).*

* cited by examiner

*Primary Examiner* — Pamela H Weiss
(74) *Attorney, Agent, or Firm* — Birch, Stewart, Kolasch & Birch, LLP

(57) ABSTRACT

In a hydraulic composition for additive manufacturing which includes (A) at least one water-soluble hydroxyalkyl alkyl cellulose selected from hydroxypropyl methyl cellulose and hydroxyethyl methyl cellulose, (B) a defoamer, (C) cement, (D) water and (E) diutan gum, the water-soluble hydroxyalkyl alkyl cellulose has an alkoxy group degree of substitution of from 1.6 to 2.0 and a 2 wt % aqueous-solution viscosity at 20° C. of from 50 to 1,000 mPa·s and the water is added in an amount of from 25 to 70 parts by weight per 100 parts by weight of the cement. The composition has a good extrudability from a nozzle and a good self-supportability following deposition.

2 Claims, No Drawings

HYDRAULIC COMPOSITION

CROSS-REFERENCE TO RELATED APPLICATION

This non-provisional application claims priority under 35 U.S.C. § 119(a) on Patent Application No. 2022-063346 filed in Japan on Apr. 6, 2022, the entire contents of which are hereby incorporated by reference.

TECHNICAL FIELD

The present invention relates to a hydraulic composition suitable for additive manufacturing by 3D printing.

BACKGROUND ART 3D printing refers to processes that form a three-dimensional object by successively building up layers of a material as sectional shapes based on three-dimensional data (additive manufacturing). Major 3D printing processes are broadly divided into four types: binder jetting (in which a liquid binder is jetted onto a powder bed and selectively solidified), directed energy deposition (the position of heat generation is controlled so as to selectively melt and bond a material), material jetting (liquid droplets of a material are jetted and selectively deposited and cured), and material extrusion (a material having flow properties is extruded from a nozzle and solidified).

In cases where a cementitious material is used in 3D printing, of these processes, material extrusion is especially suitable. The properties desired of the material in such cases are ease of extrusion from a nozzle and self-supportability following deposition. Because these are basically incompatible properties, it has been difficult to confer the material with both properties at the same time.

To resolve this problem, JP-A 2020-105023 attempts to provide both extrudability and self-supportability following deposition by setting a specific relationship between the content of a cellulose-based thickener and the content of silica fume.

However, although JP-A 2020-105023 specifies the 1 wt % aqueous-solution viscosity of the cellulose-based thickener for each shear rate, because silica fume-containing hydraulic compositions are very thixotropic, the properties of the cellulose-based thickener do not fully come into play, leading to a poor dischargeability and other undesirable effects.

SUMMARY OF THE INVENTION

It is therefore an object of the present invention to provide a hydraulic composition which is suitable for 3D printing by a material extrusion process and which has a good extrudability from a nozzle and also has a good self-supportability following deposition.

As a result of intensive investigations, I have discovered that by using a water-soluble hydroxyalkyl alkyl cellulose having a specific degree of substitution (DS) and a specific aqueous-solution viscosity, a defoamer, cement, water and diutan gum to prepare a hydraulic composition, the pressure when the resulting composition is extruded from a nozzle is low and the composition has a good self-supportability following deposition.

Accordingly, the invention provides a hydraulic composition which includes (A) at least one water-soluble hydroxyalkyl alkyl cellulose selected from the group consisting of hydroxypropyl methyl cellulose and hydroxyethyl methyl cellulose, (B) a defoamer, (C) cement, (D) water and (E) diutan gum, wherein the water-soluble hydroxyalkyl alkyl cellulose has an alkoxy group degree of substitution (DS) of from 1.6 to 2.0 and a 2 wt % aqueous-solution viscosity at 20° C. of from 50 to 1,000 mPa·s, and the water is added in an amount of from 25 to 70 parts by weight per 100 parts by weight of the cement.

In a preferred embodiment of the hydraulic composition of the invention, the water-soluble hydroxyalkyl alkyl cellulose is added in an amount of from 0.1 to 0.6 part by weight per 100 parts by weight of the cement.

In another preferred embodiment of the invention, the diutan gum is added in an amount of from 0.01 to 0.3 part by weight per 100 parts by weight of the cement.

In yet another preferred embodiment, the water-soluble hydroxyalkyl alkyl cellulose is hydroxypropyl methyl cellulose which has a thermal gelation temperature of between 55° C. and 65° C.

In still another preferred embodiment, the water-soluble hydroxyalkyl alky cellulose is hydroxyethyl methyl cellulose which has a thermal gelation temperature of between 68° C. and 83° C.

In a further preferred embodiment, the hydraulic composition is adapted for use in additive manufacturing.

Advantageous Effects of the Invention

This invention makes it possible to provide hydraulic compositions which are cementitious materials suitable for 3D printing by material extrusion and which have good extrudability from a nozzle and good self-supportability following deposition.

DESCRIPTION OF THE PREFERRED EMBODIMENTS

The hydraulic composition according to the present invention is described in detail below.

The hydraulic composition of the invention, which includes (A) at least one water-soluble hydroxyalkyl alkyl cellulose selected from the group consisting of hydroxypropyl methyl cellulose and hydroxyethyl methyl cellulose, (B) a defoamer, (C) cement, (D) water and (E) diutan gum, is characterized in that the water-soluble hydroxyalkyl alkyl cellulose has an alkoxy group degree of substitution (DS) of from 1.6 to 2.0 and a 2 wt % aqueous-solution viscosity at 20° C. of from 50 to 1,000 mPa·s and the water (D) is added in an amount of from 25 to 70 parts by weight per 100 parts by weight of the cement.

The hydraulic composition of the invention is a hydraulic composition which includes a water-soluble hydroxyalkyl alkyl cellulose, a defoamer, cement, water and diutan gum.

Component A

The water-soluble hydroxyalkyl alkyl cellulose used in the invention is at least one selected from hydroxypropyl methyl cellulose (HPMC) and hydroxyethyl methyl cellulose (HEMC).

The water-soluble hydroxyalkyl alkyl cellulose has an alkoxy group degree of substitution (DS) which, for the hydraulic composition of the invention to exhibit both extrudability from a nozzle and self-supportability following deposition, must be from 1.6 to 2.0, and is preferably from 1.6 to 1.95, more preferably from 1.6 to 1.93, and even more preferably from 1.65 to 1.93. Also, from the standpoint of solubility during summer use, the hydroxyalkoxy group molar substitution (MS) in the water-soluble hydroxyalkyl alkyl cellulose is preferably from 0.05 to 0.6, more preferably from 0.1 to 0.5, and even more preferably from 0.15 to 0.4.

The alkoxy group DS in the water-soluble hydroxyalkyl alkyl cellulose is the average number of alkoxy groups per anhydroglucose unit, and the hydroxyalkoxy group MS in the water-soluble hydroxyalkyl alkyl cellulose is the average number of moles of hydroxyalkoxy groups per anhydroglucose unit. The alkoxy group DS and hydroxyalkoxy group MS in the water-soluble hydroxyalkyl alkyl cellulose can be determined by converting the values measurable by the degree of substitution analysis method for hypromellose (hydroxypropyl methyl cellulose) described in the Japanese Pharmacopoeia, $18^{th}$ Edition.

The water-soluble hydroxyalkyl alkyl cellulose has a 2 wt % aqueous-solution viscosity at 20° C. which, for the hydraulic composition of the invention to exhibit both extrudability from a nozzle and self-supportability following deposition, must be from 50 to 1,000 mPa·s, and is preferably from 100 to 800 mPa·s, more preferably from 200 to 700 mPa·s, and even more preferably from 300 to 600 mPa·s. The 2 wt % aqueous-solution viscosity at 20° C. of the water-soluble hydroxyalkyl alkyl cellulose can be measured using a Brookfield type viscometer.

It is critical for the water-soluble hydroxyalkyl alkyl cellulose of component (A) to have an alkoxy group degree of substitution (DS) of from 1.6 to 2.0 and a 2 wt % aqueous-solution viscosity at 20° C. of from 50 to 1,000 mPa·s. The alkoxy degree of substitution is preferably from 1.6 to 1.95 and the 2 wt % aqueous-solution viscosity at 20° C. is preferably from 100 to 800 mPa·s. The alkoxy degree of substitution is more preferably from 1.65 to 1.93 and the 2 wt % aqueous-solution viscosity at 20° C. is more preferably from 300 to 600 mPa·s.

In terms of suitable combinations of the alkoxy group degree of substitution (DS), the hydroxyalkoxy group molar substitution (MS) and the 2 wt % aqueous-solution viscosity at 20° C., when the water-soluble hydroxyalkyl alkyl cellulose serving as component (A) is hydroxypropyl methyl cellulose, it is preferable for the methoxy group degree of substitution to be from 1.6 to 2.0, the hydroxypropoxy group molar substitution to be from 0.05 to 0.6 and the 2 wt % aqueous-solution viscosity at 20° C. to be from 50 to 1,000 mPa·s, more preferable for the methoxy group degree of substitution to be from 1.6 to 1.95, the hydroxypropoxy group molar substitution to be from 0.1 to 0.5 and the 2 wt % aqueous-solution viscosity at 20° C. to be from 100 to 800 mPa·s; and even more preferable for the methoxy group degree of substitution to be from 1.65 to 1.93, the hydroxypropoxy group molar substitution to be from 0.15 to 0.4 and the 2 wt % aqueous-solution viscosity at 20° C. to be from 300 to 600 mPa·s. When the water-soluble hydroxyalkyl alkyl cellulose serving as component (A) is hydroxyethyl methyl cellulose, it is preferable for the methoxy group degree of substitution to be from 1.6 to 2.0, the hydroxyethoxy group molar substitution to be from 0.05 to 0.6 and the 2 wt % aqueous-solution viscosity at 20° C. to be from 50 to 1,000 mPa·s; more preferable for the methoxy group degree of substitution to be from 1.6 to 1.95, the hydroxyethoxy group molar substitution to be from 0.1 to 0.5 and the 2 wt % aqueous-solution viscosity at 20° C. to be from 100 to 800 mPa·s; and even more preferable for the methoxy group degree of substitution to be from 1.65 to 1.93, the hydroxyethoxy group molar substitution to be from 0.15 to 0.4 and the 2 wt % aqueous-solution viscosity at 20° C. to be from 300 to 600 mPa·s.

From the standpoint of solubility during summer use, the water-soluble hydroxyalkyl alkyl cellulose used in the invention has a thermal gelation temperature which, when this component is hydroxypropyl methyl cellulose, is preferably between 55 and 65° C., more preferably between 55 and 64° C., and even more preferably between 55 and 63° C. When this component is hydroxyethyl methyl cellulose, the thermal gelation temperature is preferably between 68 and 83° C., more preferably between 68 and 81° C., and even more preferably between 68 and 80° C.

The thermal gelation temperature of the water-soluble hydroxyalkyl alkyl cellulose can be measured using a torsional vibration viscometer. When the temperature of the water-soluble hydroxyalkyl alkyl cellulose adjusted to 2 wt % is raised from 20° C. at a rate of 1° C./min, the temperature at which the viscosity of the cellulose begins to decrease is treated here as the thermal gelation temperature.

The water-soluble hydroxyalkyl alkyl cellulose serving as component A is added in an amount per 100 parts by weight of the cement serving as component C which, for the hydraulic composition of the invention to exhibit both extrudability from a nozzle and self-supportability following deposition, is preferably from 0.1 to 0.6 part by weight, more preferably from 0.15 to 0.55 part by weight, and even more preferably from 0.2 to 0.5 part by weight.

Component B

The defoamer serves to suppress air bubbles entrained by the water-soluble hydroxyalkyl alkyl cellulose. The presence of numerous air bubbles is harmful in a number of respects, such as lowering the strength of the hydraulic composition and making the self-supportability following deposition inferior. The defoamer used in this invention is exemplified by oxyalkylene, silicone, alcohol, mineral oil, fatty acid and fatty acid ester-type defoamers.

Examples of oxyalkylene-type defoamers include polyoxyalkylenes such as (poly)oxyethylene (poly)oxypropylene adducts; (poly)oxyalkylene alkyl ethers such as diethylene glycol heptyl ether, polyoxyethylene oleyl ether, polyoxypropylene butyl ether, polyoxyethylene polyoxypropylene 2-ethylhexyl ether, and oxyethylene oxypropylene adducts of higher alcohols having 8 or more carbons or dihydric alcohols having 12 to 14 carbons; (poly)oxyalkylene (alkyl)aryl ethers such as polyoxypropylene phenyl ether and polyoxyethylene nonylphenyl ether; acetylene ethers obtained by the addition polymerization of an alkylene oxide with an acetylene alcohol such as 2,4,7,9-tetramethyl-5-decyn-4,7-diol, 2,5-dimethyl-3-hexyn-2,5-diol or 3-methyl-1-butyn-3-ol; (poly)oxyalkylene fatty acid esters such as diethylene glycol oleic acid esters, diethylene glycol lauric acid esters and ethylene glycol distearic acid esters; (poly)oxyalkylene sorbitan fatty acid esters such as polyoxyethylene sorbitan monolaurate and polyoxyethylene sorbitan trioleate; (poly)oxyalkylene alkyl(aryl) ether sulfates such as sodium polyoxypropylene methyl ether sulfate and polyoxyethylene dodecylphenol ether sulfate; (poly)oxyalkylene alkyl phosphates such as (poly)oxyethylene stearyl phosphate; (poly)oxyalkylene alkylamines such as polyoxyethylene laurylamine; and polyoxyalkylene amides.

Examples of silicone-type defoamers include dimethyl silicone oils, silicone pastes, silicone emulsions, organic modified polysiloxanes (polyorganosiloxanes such as dimethylpolysiloxane) and fluorosilicone oils.

Examples of alcohol-type defoamers include octyl alcohol, 2-ethylhexyl alcohol, hexadecyl alcohol, acetylene alcohol and glycols.

Examples of mineral oil-type defoamers include kerosene and liquid paraffin.

Examples of fatty acid-type defoamers include oleic acid, stearic acid, and alkylene oxide adducts of these.

Examples of fatty acid ester-type defoamers include glycerol monoricinolate, alkenyl succinic acid derivatives, sorbitol monolaurate, sorbitol trioleate and natural waxes.

In this invention, from the standpoint of the antifoaming performance, the use of an oxyalkylene-type defoamer is preferred.

The defoamer serving as component B is added in an amount per 100 parts by weight of the water-soluble hydroxyalkyl alkyl cellulose which, from the standpoint of such considerations as the decrease in self-supportability following deposition owing to air bubbles entrained during preparation of the hydraulic composition and the strength of the hydraulic composition, is preferably from 1 to 30 parts by weight, more preferably from 3 to 29 parts by weight, and even more preferably from 5 to 28 parts by weight.

Component C

The cement used in the present invention is exemplified by various types of cement, including ordinary portland cement, high early-strength portland cement, moderate-heat portland cement, blast furnace cement, silica cement, fly ash cement, alumina cement and ultrahigh early-strength portland cement.

Component D

The water used in the invention may be, for example, tap water or seawater. From the standpoint of preventing salt damage, tap water is preferred.

The amount of water added as component D per 100 parts by weight of the cement must be from 25 to 70 parts by weight, and is preferably from 28 to 67 parts by weight, and more preferably from 30 to 65 parts by weight.

For the hydraulic composition of the invention to exhibit both extrudability from a nozzle and self-supportability following deposition, the amount of water used in the composition relative to the combined amount of cement and the subsequently described fine aggregate is preferably from 15 to 70 wt %, more preferably from 16 to 65 wt %, and even more preferably from 17 to 60 wt %.

Component E

The hydraulic composition of the invention includes diutan gum as component (E).

For the hydraulic composition of the invention to exhibit both extrudability from a nozzle and self-supportability following deposition, the amount of diutan gum added as component E per 100 parts by weight of cement is preferably from 0.01 to 0.3 part by weight, more preferably from 0.02 to 0.25 part by weight, and even more preferably from 0.02 to 0.2 part by weight.

Other Ingredients

The hydraulic composition of the invention may additionally include a fine aggregate. Suitable examples of the fine aggregate include river sand, pit sand, beach sand, inland sand, silica sand and the like that are used as fine aggregate for ready-mix concrete production or plastering. The particle size is preferably from 0.075 to 5 mm, more preferably from 0.075 to 2 mm, and even more preferably from 0.075 to 1 mm.

The amount of fine aggregate used per 100 parts by weight of the combined amount of cement and fine aggregate is preferably from 15 to 85 parts by weight, more preferably from 20 to 80 parts by weight, and even more preferably from 25 to 75 parts by weight.

A portion of the fine aggregate may be substituted with an inorganic bulking agent or an organic bulking agent. Examples of suitable inorganic bulking agents include fly ash, blast furnace slag, talc, calcium carbonate, silica fume, marble powder (limestone powder), pearlite, and the hollow volcanic glass microspheres known in Japan as "Shirasu balloons." Examples of suitable organic bulking agents include expanded styrene beads, and expanded ethylene vinyl alcohol that has been granulated. Inorganic bulking agents and organic bulking agents typically have a particle size of 5 mm or less, which is appropriate for use in the present invention.

In the practice of the invention, additionally, a water-soluble polymeric substance other than the above may be used for the purpose of further improving the degree to which the hydraulic composition exhibits both extrudability from a nozzle and self-supportability following deposition. Examples of water-soluble polymeric substances that may be used in this case include synthetic polymeric substances such as polyacrylamide, polyethylene glycol and polyvinyl alcohol, and polymeric substances of natural origin such as pectin, gelatin, casein, welan gum, xanthan gum, gellan gum, locust bean gum and guar gum. The water-soluble polymeric substance is added in an amount per 100 parts by weight of cement that is preferably from 0.01 to 1.0 part by weight, more preferably from 0.05 to 0.8 part by weight, and even more preferably from 0.1 to 0.6 part by weight.

The hydraulic composition of the invention may also include, where necessary, known water-reducing agents, retarders, setting accelerators, short fibers, expansive agents and shrinkage-reducing agents within ranges that do not detract from the advantageous effects of the invention.

Exemplary water-reducing agents include polycarboxylate-based water-reducing agents such as polycarboxylate ether-based compounds, complexes of a polycarboxylate ether-based compound and a crosslinked polymer, complexes of a polycarboxylate ether-based compound and an oriented polymer, complexes of a polycarboxylate ether-based compound and a highly modified polymer, polyethercarboxylate-based polymeric compounds, maleic acid copolymers, maleic acid ester copolymers, maleic acid derivative copolymers, carboxyl group-containing polyether-based compounds, polycarboxylic acid group-containing multi-component copolymers having terminal sulfone groups, polycarboxylate-based graft copolymers, polycarboxylate-based compounds and polycarboxy late ether-based polymers. Examples of melamine-based water-reducing agents include melamine sulfonic acid formalin condensates, melamine sulfonate condensates and melamine sulfonate polyol condensates. Examples of lignin-based water-reducing agents include lignin sulfonates and derivatives thereof.

In the practice of the invention, from the standpoint of the water-reducing effect and the flowability and flow retention, the use of a polycarboxylate-based water-reducing agent is preferred.

The water-reducing agent is added in an amount per 100 parts by weight of the cement which is preferably from 0.1 to 5 parts by weight.

Examples of retarders include hydroxycarboxylic acids such as gluconic acid, citric acid and glucoheptonic acid, and also inorganic salts of these such as the sodium, potassium, calcium, magnesium and ammonium salts; sugars such as glucose, fructose, galactose, saccharose, xylose, arabinose, ribose, oligosaccharides and dextran; and boric acid. The retarder is preferably added in an amount of from 0.005 to 10 parts by weight per 100 parts by weight of cement.

Setting accelerators are broadly divided into inorganic compounds and organic compounds. Examples of inorganic compounds include chlorides such as calcium chloride and potassium chloride, nitrites such as sodium nitrite and calcium nitrite, nitrates such as sodium nitrate and calcium nitrate, sulfates such as calcium sulfate, sodium sulfate and alum, thiocyanates such as sodium thiocyanate, hydroxides such as sodium hydroxide and potassium hydroxide, carbonates such as calcium carbonate, sodium carbonate and lithium carbonate, water glass, and alumina compounds such as aluminum hydroxide and aluminum oxide. Examples of organic compounds include amines such as diethanolamine and triethanolamine, calcium salts of organic acids such as calcium formate and calcium acetate, and maleic anhydride.

The amount of setting accelerator added per 100 parts by weight of the cement is preferably from 0.005 to 10 parts by weight.

Examples of short fibers include polypropylene fibers, vinylon fibers, acrylic fiber, glass fibers, steel fibers and basalt fibers. The amount of short fibers added per 100 parts by weight of the cement is preferably from 0.1 to 5 parts by weight, more preferably from 0.2 to 4 parts by weight, and even more preferably from 0.3 to 3 parts by weight.

Examples of expansive agents include ettringite-based expansive agents, lime-based expansive agents and ettringite/lime composite-based expansive agents. The amount of expansive agent added per 100 parts by weight of the cement is preferably from 0.5 to 30 parts by weight, more preferably from 1 to 30 parts by weight, and even more preferably from 3 to 25 parts by weight.

Examples of shrinkage-reducing agents include lower and higher alcohol-alkylene oxide adducts, glycol ether derivatives and polyether derivatives. The amount of shrinkage-reducing agent added per 100 parts by weight of cement is preferably from 0.1 to 0.5 part by weight, more preferably from 0.15 to 0.45 part by weight, and even more preferably from 0.2 to 0.4 part by weight.

The hydraulic composition of the invention has a good extrudability from a nozzle and also has a good self-supportability following deposition, and is thus well-suited for use in additive manufacturing, particularly 3D printing by a material extrusion process.

EXAMPLES

The following Examples and Comparative Examples are provided to illustrate the invention, and are not intended to limit the scope thereof. In the Examples below, the viscosities are values measured using a Brookfield-type rotational viscometer. The thermal gelation temperature is the temperature at which, when the temperature of a water-soluble hydroxyalkyl alkyl cellulose (CE) prepared to a concentration of 2 wt % is raised from 20° C. at a rate of 1° C./min, the viscosity measured using a torsional vibration viscometer begins to decrease.

Examples 1 to 10, Comparative Examples 1 to 3

Materials Used:
(1) Cement (C): ordinary portland cement (from Taiheiyo Cement Corporation)
(2) Water: tap water
(3) Water-soluble hydroxyalkyl alkyl cellulose (CE): sample details are shown in Table 1
(4) Diutan gum (DG): KELCO-VIS DG (from CP Kelco)
(5) Defoamer: SN Defoamer 14HP (from San Nopco Limited)

TABLE 1

| Sample No. | Type | Degree of substitution (DS) | Molar substitution (MS) | Viscosity of 2 wt % aqueous solution (mPa·s) | Thermal gelation Temperature (° C.) |
|---|---|---|---|---|---|
| CE-1 | HPMC | 1.82 | 0.16 | 452 | 60 |
| CE-2 | HPMC | 1.92 | 0.24 | 55 | 58 |
| CE-3 | HPMC | 1.79 | 0.18 | 783 | 61 |
| CE-4 | HEMC | 1.77 | 0.20 | 974 | 72 |
| CE-5 | HEMC | 1.66 | 0.11 | 398 | 74 |
| CE-6 | HPMC | 1.81 | 0.17 | 15 | 61 |
| CE-7 | HPMC | 1.78 | 0.15 | 1,320 | 62 |
| CE-8 | HPMC | 1.42 | 0.22 | 430 | 69 |

HPMC: hydroxypropyl methyl cellulose
HEMC: hydroxyethyl methyl cellulose

Preparation of Hydraulic Composition

Using a mortar mixer that conforms to JIS R 5201, the materials in the amounts shown in Table 2 were placed in a mixing bowl and mixing was carried out for 60 seconds by low-speed stirring (revolving action, 140 rpm; planetary action, 60 rpm). Mixing was then carried out for 90 seconds by high-speed stirring (revolving action, 290 rpm; planetary action, 120 rpm), giving the hydraulic composition. The temperature of the material was adjusted so as to fall within the range of 20±3° C. when mixing is complete. The CE, DG and defoamer were mixed with the cement beforehand and then charged together with the cement into the mixing bowl.

TABLE 2

| Cement (g) | Water (g) | CE | DG | Defoamer |
|---|---|---|---|---|
| 2,000 | 1,000 | see Table 3 | see Table 3 | amount equivalent to (CE + DG) × 10 wt % |

The shear stress versus shear rate for each of the resulting hydraulic compositions was measured under the following conditions using a rheometer (HAAKE MARS 60, from Thermo Fisher Scientific Inc.).

Measurement tool: 20 mm bob-type rotor (CC20)
Shear rate: raised from 0.1 s$^{-1}$ to 100 s$^{-1}$ (120 seconds): lowered from 100 s$^{-1}$ to 0.1 s$^{-1}$
Gap: 4.2 mm
Temperature: 20° C.

The yield value, hysteresis loop (H.L.) area and H.L. area/yield value were computed by the following methods and evaluated.

Yield value (Y): The yield value was computed by fitting to a Casson plot the descending curve of shear rate (abscissa) versus shear stress (ordinate) obtained when the shear rate was lowered. At yield values below 15 Pa, the hydraulic compositions were judged to have an excellent dischargeability.

H.L. area ($A_{HL}$): The difference in the areas of the ascending curve of shear rate (abscissa) versus shear stress (ordinate) obtained when the shear rate was raised and the descending curve mentioned above, i.e., the area of the hysteresis loop formed by the ascending curve and the descending curve, was determined. At H.L. areas of 1,000 Pa/s or more, the hydraulic compositions were judged to have excellent thixotropic properties.

H.L. area/Yield value ($A_{HL}/Y$): This is the value obtained by dividing the H.L. area by the yield value. At H.L.

area/yield values of 150 s$^{-1}$ or more, the hydraulic compositions were judged to have both dischargeability and thixotropic properties.

The test results are shown in Table 3.

TABLE 3

|  |  | CE | | DG | Yield value Y | H.L. area $A_{HL}$ | $A_{HL}/Y$ |
| --- | --- | --- | --- | --- | --- | --- | --- |
|  |  | Type | Amount* | Amount* | (Pa) | (Pa/s) | (s$^{-1}$) |
| Example | 1 | CE-1 | 0.3 | 0.1 | 10.18 | 3,030 | 298 |
|  | 2 | CE-2 | 0.3 | 0.1 | 6.96 | 1,825 | 262 |
|  | 3 | CE-3 | 0.3 | 0.1 | 12.68 | 2,942 | 232 |
|  | 4 | CE-4 | 0.3 | 0.1 | 14.38 | 2,726 | 190 |
|  | 5 | CE-5 | 0.3 | 0.1 | 9.53 | 1,862 | 195 |
|  | 6 | CE-1 | 0.2 | 0.1 | 10.07 | 2,803 | 278 |
|  | 7 | CE-1 | 0.5 | 0.1 | 13.91 | 2,306 | 166 |
|  | 8 | CE-1 | 0.3 | 0.05 | 14.27 | 1,279 | 90 |
|  | 9 | CE-1 | 0.3 | 0.15 | 11.66 | 2,651 | 227 |
|  | 10 | CE-1 | 0.3 | 0.2 | 14.93 | 3,441 | 230 |
| Comparative Example | 1 | CE-6 | 0.3 | 0.1 | 9.57 | 1,385 | 145 |
|  | 2 | CE-7 | 0.3 | 0.1 | 21.15 | 2,308 | 109 |
|  | 3 | CE-8 | 0.3 | 0.1 | 6.20 | 687 | 111 |

*Parts by weight per 100 parts by weight of cement

In Examples 1 to 10, which used a CE wherein "the water-soluble hydroxyalkyl alkyl cellulose has an alkoxy group degree of substitution (DS) of from 1.6 to 2.0 and a 2 wt % aqueous-solution viscosity at 20° C. of from 50 to 1,000 mPa·s" and "the water is added in an amount of from 25 to 70 parts by weight per 100 parts by weight of the cement," the yield value, the H.L. area and the H.L. area/yield value all satisfied the above criteria.

By contrast, under the conditions in Comparative Example 1, the yield value and the H.L. area satisfied their respective criteria, but the H.L. area/yield value was low and so the hydraulic composition did not exhibit both good dischargeability and good thixotropic properties. In Comparative Example 2, the yield value was high and so the dischargeability was poor. In Comparative Example 3, the H.L. area was low and so the thixotropic properties were poor. In addition, in both Comparative Examples 2 and 3, the H.L. area/yield value did not satisfy the above criterion.

Japanese Patent Application No. 2022-063346 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for forming an article by additive manufacturing a material, wherein
    the material is a hydraulic composition comprising (A) at least one water-soluble hydroxyalkyl alkyl cellulose selected from the group consisting of hydroxypropyl methyl cellulose and hydroxyethyl methyl cellulose, (B) a defoamer, (C) cement, (D) water and (E) diutan gum, wherein
    the water-soluble hydroxyalkyl alkyl cellulose has an alkoxy group degree of substitution (DS) of from 1.6 to 2.0 and a 2 wt % aqueous-solution viscosity at 20° C. of from 50 to 1,000 mPa·s, and
    the water is added in an amount of from 25 to 70 parts by weight per 100 parts by weight of the cement.

2. The method of claim 1, comprising forming the article by successively building up layers of the hydraulic composition, wherein the article is a three-dimensional object.

* * * * *